Oct. 17, 1939.  T. BROWN ET AL  2,176,326
HITCH DEVICE
Filed Jan. 3, 1938  2 Sheets-Sheet 1
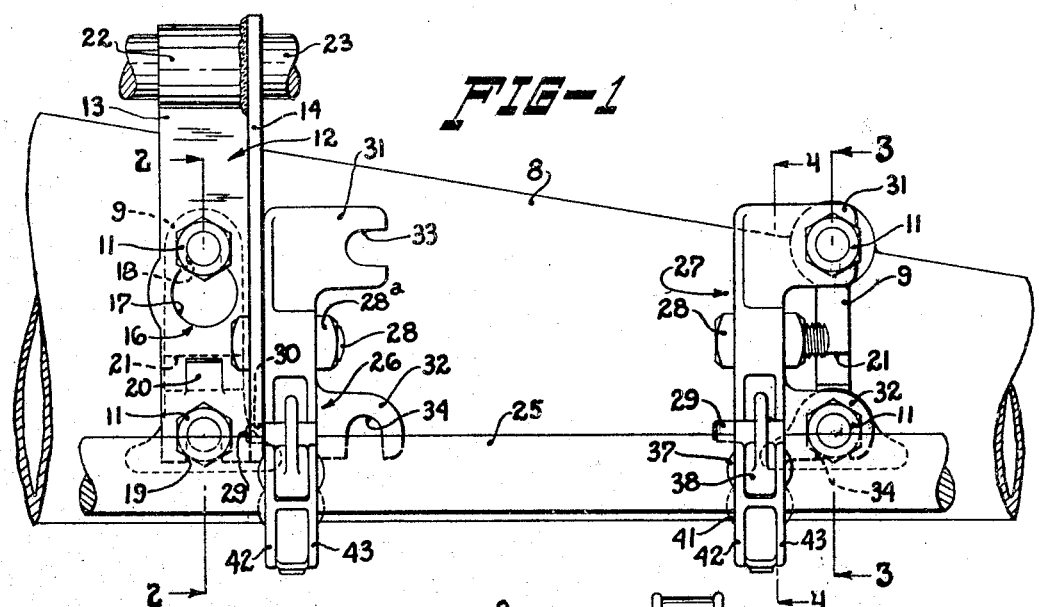
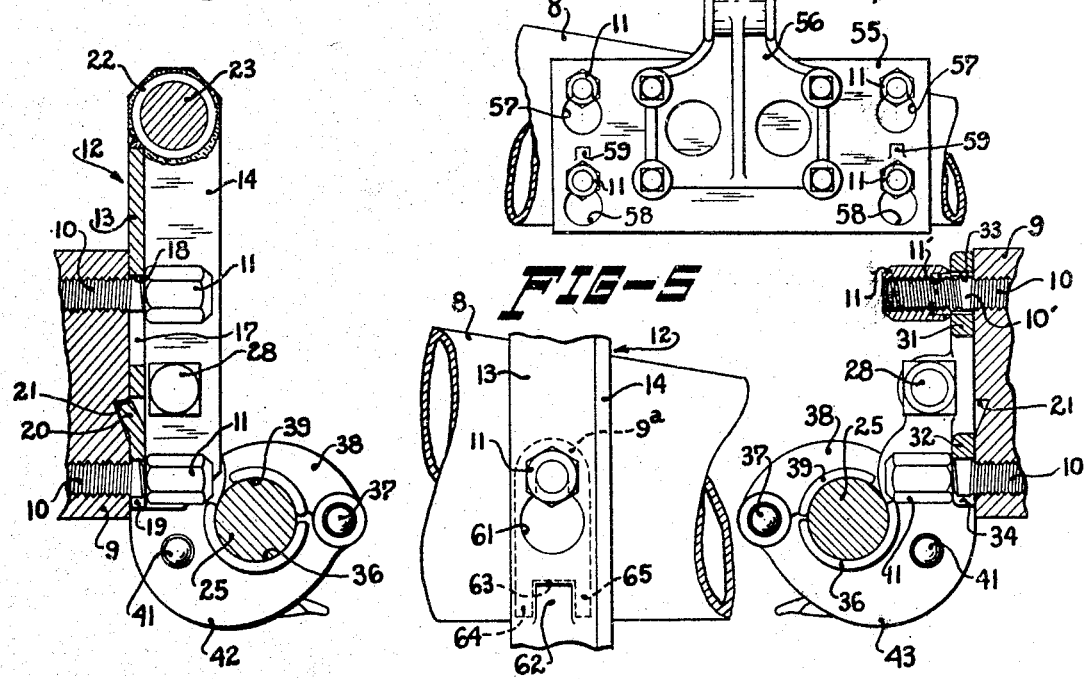
WITNESS
N. C. Westling
INVENTORS
Theophilus Brown & Talbert W. Paul
BY Brown, Jackson, Boettcher & Quinn
ATTORNEYS Oct. 17, 1939.   T. BROWN ET AL   2,176,326
HITCH DEVICE
Filed Jan. 3, 1938   2 Sheets-Sheet 2
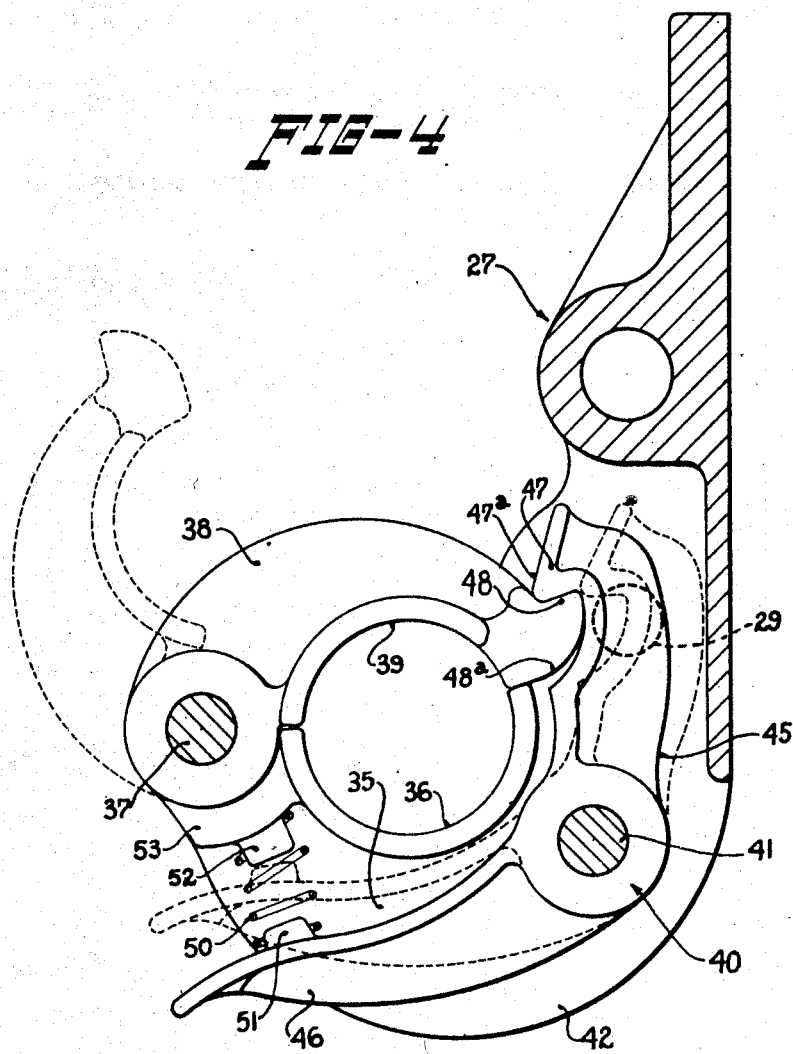
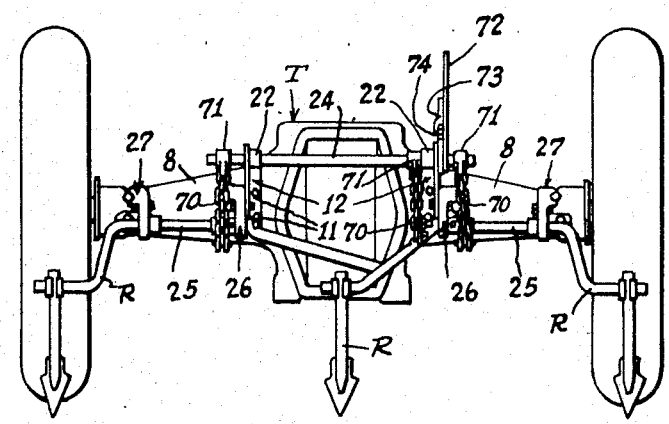
WITNESS
N. G. Westling
INVENTORS
Theophilus Brown & Talbert W. Paul
BY
Brown, Jackson, Boettcher & Dienner
ATTORNEYS Patented Oct. 17, 1939

2,176,326

UNITED STATES PATENT OFFICE 2,176,326

HITCH DEVICE

Theophilus Brown and Talbert W. Paul, Moline, Ill., assignors to Deere & Company, Moline, Ill., a corporation of Illinois Application January 3, 1938, Serial No. 183,067

15 Claims. (Cl. 280—33.44)

The present invention relates generally to improved hitch devices for detachably connecting implements to a tractor, and more particularly to means for detachably connecting such implements to the rear axle housing of a tractor.

Ever since the advent of tractor mounted implements for use on farms and in other situations the manufacturers of such implements have been confronted with the problem of providing suitable hitch devices between the implements and the several parts of the tractor to which the implements are adapted to be connected whereby such implements may be easily and quickly attached to the tractor and detached therefrom with a minimum of effort on the part of the operator. Heretofore it has required quite an expenditure of time and labor in connecting the implements to a tractor, owing to the fact that such installations required the bolting on of a number of separate parts and braces, and some of the heavier implement parts required considerable effort in raising them and holding them in the proper position while the connecting bolts were inserted and the nuts tightened up on such bolts. Various types of hitch devices have been proposed for facilitating the connection of implements to the rear axle housings of a tractor, but so far as we are aware such devices have not proved entirely satisfactory either because too much time had to be devoted to making the connections except under the most favorable conditions, or because they were of such a nature that they increased the cost of manufacture of the tractor to an undesirable extent.

With the above in view it is the principal object of the present invention to provide improved means for connecting an implement to the rear axle housing of a tractor whereby the implement may be quickly attached to the tractor with a minimum expenditure of labor on the part of the operator, and which will not increase the cost of manufacture of the tractor to any great extent. To this end we provide the rear axle housing at each side of the tractor with a pair of spaced bosses cast integral therewith and having flat outer surfaces lying in the same vertical plane, with stud bolts permanently secured therein and extending outwardly from such flat surfaces and cap nuts threaded on the outer ends of such bolts, in connection with adapter plates or supporting brackets carried by the implement and provided with means whereby such brackets may be slipped over such studs without completely removing the cap nuts therefrom and may thereafter be securely clamped to said bosses by drawing up the cap nuts on said studs.

A further object of the invention is to provide an attaching plate or bracket of this type with bearing means for supporting the draft beam of a cultivating unit, comprising separable bearing members and latch means for locking said bearing members in closed position around said draft beam.

Other objects and advantageous features of the present invention will be apparent from the following description of the preferred embodiment of our invention taken in connection with the accompanying drawings, in which:

Figure 1 is a rear elevational view of a portion of the rear axle housing at one side of a tractor with a pair of adapter plates that support the draft beam of a cultivating unit provided with a hand lift secured in position on such axle housing, in accordance with the principles of the present invention;

Figure 2 is a vertical cross-sectional view taken substantially on the plane of the line 2—2 of Figure 1 and showing the means for holding the supporting bracket for the hand lift lever against vertical movement relative to the boss of the rear axle housing on which it is mounted;

Figure 3 is a vertical cross-sectional view taken substantially on the plane of the line 3—3 of Figure 1 and showing the manner of connecting the adapter plate or draft beam bearing bracket directly to the boss of the rear axle housing;

Figure 4 is an enlarged vertical cross-sectional view taken substantially on the plane of the line 4—4 of Figure 1 and showing more in detail the separable bearing means of the adapter plate or bearing bracket for the draft beam of the cultivating unit and the latch means by which such separable bearing means are locked in position to hold the draft beam in position;

Figure 5 is a rear elevational view of a modified form of adapter plate that extends across between and is adapted to be clamped to the studs on the bosses provided at opposite sides of the axle housing;

Figure 6 shows still another modification in which only one stud is provided on the rear axle housing and used for connecting an adapter bracket of a hitch device to the rear axle housing; and Figure 7 is a rear view of a tractor showing a cultivating attachment having a hand operated lifting mechanism secured to the rear axle housing of the tractor by adapter plates in accordance with the principles of the present invention.

Referring now more particularly to Figures 1, 2, 3 and 7, the rear axle housing of the tractor T is indicated by 8, and such housing has cast integral therewith a pair of bosses 9 spaced longitudinally therealong and extending outwardly rearwardly from the main body portion of the casting. The bosses 9 are provided with substantially vertically extending flat outer faces that lie in the same transverse plane relative to the tractor, so that the cultivator draft beam or other tool supporting means connected to the rear axle housing by the adapter plates or brackets to be hereinafter described will lie in a plane substantially at right angles to the line of draft of the tractor, as is customary in tractor mounted cultivators. Each of the bosses 9 is tapped adjacent its upper and lower ends to provide threaded recesses therein (Figures 2 and 3) for receiving upper and lower stud bolts 10 that are provided on their outer ends with hexagonal or other suitably shaped cap nuts 11, and the tractors are adapted to be shipped from the factory with such studs and cap nuts in position on the rear axle housing.

The implements that are adapted to be mounted on the rear axle housing of the tractor are provided with suitable adapter plates or supporting brackets having apertures or slots therein formed so that said brackets can be slipped over the studs 10 by loosening the cap nuts 11 but not completely removing them from the studs, whereby the weight of the implement part is supported by the studs while the cap nuts are being drawn up, thus relieving the operator of the labor of supporting the part while the nuts are being tightened. In Figures 1 and 7 we have shown the hitch means that are employed for connecting the draft beam of a cultivating unit on the tractor when the cultivator rigs carried by such beam are adapted to be raised and lowered by a hand lever or similar means, and such means includes a supporting bracket 12 in the form of an angle member having flanges 13 and 14 extending at right angles to each other and adapted to be clamped to the rear axle housing by the studs 10 and cap nuts 11 on the left hand boss 9 shown in Figure 1. For this purpose the flange 13 of the bracket 12 is provided about midway of its length with a vertically extending keyhole slot 16 having a lower circular portion 17 of sufficiently large diameter that will permit the cap nut 11 on the upper stud 10 to pass through such portion, as shown in full lines in Figure 1, and an upper generally rectangular shaped portion 18 of reduced width communicating with and extending upwardly from the portion 17 to receive the shank of the stud 10, as shown in dotted lines in said figure. While in the present application the keyhole slots have been illustrated and described as arranged on vertical axes, this is not essential as such slots may be arranged on axes extending at an angle to the vertical, as will be readily appreciated. The flange 13 of the bracket 12 is provided at its lower end with an open ended vertically extending slot 19, as shown in dotted lines in Figure 1, that is adapted to fit over the lower stud 10 behind its cap nut 11.

It will be seen from the above that in order to install the supporting bracket 12 on the rear axle housing it is only necessary to unscrew the cap nuts 11 on the studs 10 to move them away from the boss a sufficient distance to permit the bracket to be inserted between such cap nuts and the boss, and then the bracket can be slipped over the cap nut 11 on the upper stud 10 and dropped down into place on the upper and lower studs into the position shown in Figure 1, after which the cap nuts 11 are drawn up on the studs 10 to clamp the bracket securely in place against the face of the boss 9.

In order to prevent the supporting bracket 12 from being loosened by an upthrust, a small tongue or detent 20 (Figure 2) is provided on the front face of the flange 13 of the supporting bracket 12 between the slots 16 and 19, such tongue engaging in a notch 21 in the boss 9 when the bracket is clamped in position on the boss. The tongue 20 is preferably formed in the bracket 12 by a stamping operation, and the notch 21 is preferably formed in the boss 9 during the casting operation, but it is to be understood that the tongue and notch or their equivalent may be formed in any other suitable manner, as desired. As shown, the boss 9 at the right hand side of Figure 1 is also provided with a similar notch 21, the purpose of which will be pointed out later herein.

As shown in Figure 7, there is a bracket 12 secured, as just described, to the rear axle housing 8 at each side thereof, and each bracket 12 is provided at its upper end with an integrally formed bearing recess 22 to furnish a support for the bearing portion 23 of a hand operated rock shaft 24 provided for lifting the rigs of the cultivator attachment when such attachment is adapted for use with a hand lift rather than a power lift.

The cultivator rigs R, as shown in Figure 7, or other implement parts or tools, are adapted to be supported in any suitable manner on a transversely extending beam or draft bar in the form of a cylindrical member or pipe as indicated by the reference numeral 25, and such draft bar is detachably supported as hereinafter described in a pair of bearing members or adapter brackets that are indicated as an entirety by the reference numerals 26 and 27, respectively. As shown in Figure 7, each of the rigs R is suitably connected by a chain 70 or other suitable means with an arm 71 fixed to the rock shaft 24 whereby by rocking said rock shaft the rigs may be raised and lowered. The rock shaft 24 is rocked by means of a hand lever 72 fixed to said shaft and provided with the usual detent means 73 for engaging in a notched sector 74 whereby said rock shaft may be held in any of several adjusted positions. In the illustrated construction, in which provision is made for supporting a hand operated lifting lever on the hitch device, the inner bearing bracket 26 shown at the left hand side of Figure 1 is adapted to be secured to the rearwardly extending flange 14 of the supporting bracket 12 by a single connecting bolt 28 extending through openings provided therefor in the bearing bracket and the flange of the supporting bracket and secured in position by a nut 28a threaded on said bolt. The bearing member when secured to the flange 14 of the supporting bracket 12 by the bolt 28 is prevented from swinging on the bolt by a pin 29 or other part, which may be in the form of a stud cast integral with the bracket 26, that is inserted into a hole 30 in the rearwardly extending flange 14 of the bracket 12. If desired, however, the pin 29 may be in the form of a separate member and inserted through a perforated boss formed in said bearing bracket. The bearing bracket 26 is also provided with means whereby it may be connected directly to the boss 9 by the stud bolts 10 in some installations, and the bearing bracket 27 is shown as connected directly to the right hand boss 9 by the studs 10 thereof, and the means for so connecting both of the brackets 26 and 27 directly to the bosses will now be described.

As shown, the bearing brackets 26 and 27 are each provided with a pair of upper and lower lugs 31 and 32, respectively. The upper lug 31 is provided with a horizontally disposed slot 33 whereby said lug may be slid over the upper stud 10 between the boss 9 and the nut 11 on said stud by merely backing up the nut sufficiently to permit the insertion of the lug between the nut and the boss, and the lower lug 32 is provided with an upwardly extending slot 34 whereby said lug may be slid over the lower stud 10 in a similar manner, after which the nuts 11 on the studs are drawn up to securely clamp the bearing member to the rear axle housing. At the right hand of Figure 1 the bearing bracket 27 is shown as connected in this manner. With this construction of bearing bracket having both the horizontally and the vertically extending slots the bracket is held against both vertical and horizontal movement relative to the rear axle housing without the necessity of providing a tongue or detent in the bracket for engaging in a notch in the boss as was necessary in the construction and mounting of the supporting bracket 12 on the rear axle housing as before described.

As shown in Figure 3, the inside surface of each nut 11 is relieved adjacent one end as at 11' to provide clearance to accommodate the unthreaded bracket supporting portion 19' of the stud when the bracket is removed, to permit the nuts 11 to be tightened against the boss 9 when the bracket is not in use.

It may be explained at this point that each cultivator attachment for the right hand axle housing of the tractor is provided at the factory with a pair of bearing brackets 26 and 27 having lugs 31 and 32 extending to the right and also with a supporting bracket 12 with the rearwardly extending flange at the right hand side thereof, as shown in Figure 1, and that each cultivator attachment for the left hand axle housing of the tractor is provided with a pair of bearing brackets 26 and 27 having lugs 31 and 32 extending to the left, and a supporting bracket 12 with the rearwardly extending flange at the left hand side thereof is also provided. Now, if the hand operated rock shaft 24 is not needed, as is the case where the attachment is to be used on a tractor provided with a power lift, the supporting brackets 12 can be dispensed with and all four of the bearing brackets secured directly to the rear axle housing, i. e., one pair of brackets 26 and 27 being secured to the axle housing at one side of the tractor and the other pair of brackets 26 and 27 being secured to the axle housing at the other side of the tractor, as shown in Figure 7. In such case it is only necessary for the operator to unbolt the supporting brackets 12 from the bearing brackets 26, and then such bearing brackets can be mounted directly upon the inner studs 10 in the same manner as the bearing brackets 27 on the outer studs 10, as has just been described above. In such an installation, however, it is necessary to interchange the bearing member 26 with the lugs 31 and 32 extending to the right, as shown in Figure 1, with the corresponding inner bearing on the other side of the tractor having the lugs 31 and 32 extending to the left, in order that the bearing member may occupy the same position relative to the inner studs 10 that it does when it is bolted to the angle bracket 12, as will be readily appreciated.

The bearing bracket 27 is shown in detail in side elevation in Figure 4, and as there shown it is provided with a downwardly and rearwardly curved lower bearing portion 35 having a semi-cylindrical bearing recess 36 formed in its upper portion for receiving the lower portion of the cylindrical draft beam 25. Hingedly connected, as by a pivot pin 37, to the rear outer end portion of the lower bearing section 35 is a complementary upper bearing member 38 that is provided with a semi-cylindrical bearing recess 39. Means is provided for locking the upper bearing member 38 in position over the lower bearing member 35, and such means comprises a locking member or latch 40 that is pivotally supported intermediate its ends on a pivot pin 41 that is supported at its opposite ends in flanges 42 and 43 formed integral with and extending outwardly laterally from the lower portion 35 of the bracket 27 as best shown in Fig. 1. As shown in Figure 4, the latch member 40 comprises an upper or forward arm member 45 and a lower or rearwardly extending arm member 46. The upper arm member 45 is formed at its outer end to provide a hook portion 47 that is adapted to engage over a shoulder or lug 48 formed on the outer end of the upper bearing member 38 when said member is swung down into position over the lower bearing member 35 of the bracket, as shown in full lines in Figure 4. Means is provided for yieldingly holding the latch 40 in position with the hook 47 thereof in engagement over the lug 48, and such means comprises a coiled compression spring 50 that extends between a lug 51 formed integral with the arm 46 of the latch and a lug 52 formed integral with an outwardly extending flange 53 of the lower bearing portion 35 of the bracket, as shown in Figure 4. Thus, when said upper member 38 is swung on its pivot 37 into position above the member 35 of the bracket and the latch 40 engaged, the bearing portion 39 will embrace the top portion of the cultivator beam, 25 and hold it in position in the lower bearing member 35.

When it is desired to connect the cultivating unit to the rear axle housing of the tractor by the means above described, each of the supporting members or brackets 26 and 27 are first removed from the cultivator unit and then secured to the studs 10 in the manner described. Next, the upper bearing members 38 are unlocked by pushing upwardly on the outer ends of the arms 46 of the latches to move the latches against the action of the springs 50 into the position shown in dotted lines in Figure 4, and the upper bearing members 38 of brackets 26 and 27 are then swung from the full line position to the dotted line position shown in Figure 4. Then the cultivator draft beam with the rigs attached thereto is set into the bearing recesses 36 of the brackets 26 and 27 and the upper bearing members 38 are again swung down into the full line position shown in Figure 4. In such movement the curved end 48a of the lug 48 riding on the rear face 47a of the upper latch arm 45 will swing the latch 40 on its pivot against the action of the spring 50 into the dotted line position shown in Figure 4 and the upper bearing member 38 will drop down into its proper position on the lower bearing member 35, after which the latch will snap back under the action of the spring 50 into the position shown in full lines, as will be readily understood. When it is desired to disconnect the cultivator unit the latch is released from the upper bearing member 38, the bearing member is then swung back into its dotted line position, and the cultivator draft beam may then be removed from the bearing bracket. The bearing brackets may then be disconnected from the studs on the axle housing by loosening the cap nuts 11 and slipping the brackets off of the studs 10. If desired, however, the bearing brackets 26 and 27 may be left in position on the rear axle housing.

While we have described above an arrangement making use of a pair of adapter plates or brackets that can be quickly and easily connected to and disconnected from studs provided on the rear axle housing of a tractor whereby a cultivating unit may be quickly and easily connected to and disconnected from such housing, it will be apparent that the principles of the present invention are equally applicable to means for mounting various other implements provided with other forms of adapter plates on the tractor rear axle housing, whereby such implements can be quickly and easily connected to and disconnected from the rear axle housing with a minimum of effort, and, therefore, we have shown in the accompanying drawings several modifications of our invention.

In Figure 5 we have illustrated a single adapter plate or bracket 55 for supporting the standard 56 of a comparatively heavy implement, such as one bottom of a two-way plow or the like, such adapter plate being of such length that it extends outwardly beyond the two sets of studs 10 as shown whereby use is made of all four of the studs on the rear axle housing for connecting the plow to the housing. In this construction the adapter plate or bracket 55 is provided with a keyhole slot 57 in its upper portion adjacent each end thereof, said slots being similar to the keyhole slot 16 in the supporting bracket 12. Such keyhole slots 57 are adapted to cooperate with the upper studs 10 on the rear axle housing, and a second pair of keyhole slots 58 positioned below the keyhole slots 57 are adapted to cooperate with the lower studs 10 on the axle housing. In this construction of adapter plate a pair of tongues or detents 59 provided on the plate and adapted to engage in the recesses 21 in the bosses 9 of the housing act to hold the plate against vertical movement. While in Figure 5 the keyhole slots 57, 58 are illustrated as arranged on vertical axes, this is not essential as such slots may be arranged on axes extending at an angle to the vertical, as will be readily appreciated.

In Figure 6 we have shown a construction wherein the principles of our invention are embodied in a tractor having but one stud at each position on the rear axle housing, which construction may well be used for connecting light weight implements to a tractor. In this construction we have shown the supporting bracket 12 as provided with a keyhole slot 61 for cooperating with the single stud on the boss 9a of the rear axle housing 8, whereby the bracket may be slipped over the cap nut 11 on the stud, slid down between the boss and the nut and then clamped into position by tightening the nut on the stud. With such a construction of adapter plate, however, it is necessary not only to provide against upthrust on the plate but also to provide for preventing turning of the plate on the stud, and for that purpose a tongue 62 is provided on the plate for engaging in a notch 63 formed in the lower portion of the boss 9a. As shown, the notch 63 does not extend entirely across the boss as do the notches 21 provided in the bosses 9 in the other constructions described above, but rather is recessed into the boss so as to provide shoulders 64 and 65 on either side of the notch 63 that engage the opposite sides of the tongue to restrain the supporting member or adapter plate 12 against pivotal movement about the stud 10.

While in the construction shown in Figure 1, it is necessary to detach the parts 12, 26 and 27 from the cultivator unit before attaching the latter to the tractor, in the constructions shown in Figures 5 and 6, the attaching brackets may be left on the implement and the latter attached to the tractor by slipping the brackets over the studs 10 without removing the nuts, and supporting the weight of the implement, or at least the weight of the forward portion of it, on the studs while the nuts 11 are being tightened.

We claim:

1. The combination of a supporting member having a stud extending therefrom in fixed position thereon, an implement supporting bracket having an opening therein to receive said stud so that the latter supports said bracket and the associated implement part against downward movement, means on said stud for securing said bracket to said supporting member, and means acting between the bracket and the supporting member for preventing upward movement of the bracket with respect to the supporting member.

2. The combination with a tractor including a rear axle housing having a pair of vertically spaced studs extending outwardly therefrom with nuts threaded on the outer ends of said studs, of means for detachably connecting an implement to said housing comprising a bracket having a pair of vertically spaced lugs extending laterally from one side thereof and having slots therein adapted to cooperate with said studs whereby said lugs may be slipped over said studs between said housing and said nuts into a position to support the bracket on said studs, and means for connecting the bracket to the implement.

3. The combination with a tractor including a rear axle housing having a stud extending outwardly therefrom in fixed position thereon with a nut threaded on the outer end of said stud, of means for detachably connecting an implement to said housing comprising a bracket carried by said implement and having a slot formed therein whereby said bracket may be mounted on and supported by said stud, and a tongue on said bracket engaging in a notch in said housing for restraining said bracket against upward movement relative to said housing.

4. The combination with a tractor including a rear axle housing having two pairs of vertically spaced studs extending outwardly therefrom in fixed position thereon at spaced points thereon with nuts threaded on the outer ends of said studs, of means for detachably connecting implement means to said housing comprising bracket means having slots formed therein adapted to be mounted on said studs in a position to support the bracket means on the studs, means on said bracket means cooperating with means on said housing for restraining said bracket means against vertical movement relative to the housing, and means for connecting the implement means to said bracket means.

5. The combination with a tractor including a rear axle housing having a pair of vertically spaced studs extending outwardly therefrom in fixed position thereon with nuts threaded on the outer ends of said studs, of means for detachably connecting an implement to said housing comprising a bracket having a pair of vertically spaced lugs extending laterally from one side thereof and having slots therein adapted to cooperate with said studs whereby said lugs may be slipped over said studs between said housing and said nuts into a position to support the bracket on said studs, the slots in the lugs being so positioned with respect to each other as to restrain the bracket against vertical and horizontal movement relative to the housing, and means for connecting the implement to said bracket.

6. The combination with a tractor including a rear axle housing having a stud extending outwardly therefrom in fixed position thereon with a nut threaded on the outer end of said stud, of means for detachably connecting an implement to said housing comprising a bracket carried by said implement and having a keyhole slot formed therein whereby said bracket may be slipped over the nut into position on said stud between said housing and said nut, and means carried by the bracket and cooperating with means on the axle housing for preventing rotational movement of said bracket on said stud and restraining said bracket against upward movement relative to said housing.

7. The combination with a tractor including a rear axle housing having a stud extending outwardly therefrom in fixed position thereon with a nut threaded on the outer end of said stud, of means for detachably connecting an implement to said housing comprising a bracket having a keyhole slot formed therein whereby said bracket may be slipped over the nut into position on said stud between said nut and said housing, a tongue on said bracket engaging in a notch in said housing, said tongue and notch being so spaced on the bracket and housing that the bracket and housing are interengaged so as to hold the bracket against upward movement relative to said housing when the smaller portion of the keyhole slot is held on said stud, and a shoulder on each side of said notch engaging the side edges of said tongue for restraining said bracket against sidewise movement relative to said housing.

8. The combination with a tractor including a rear axle housing having two pairs of vertically spaced studs extending outwardly therefrom at spaced points thereon with nuts threaded on the outer ends of said studs, of means for detachably connecting the draft bar of a cultivating attachment having a hand operated lifting mechanism to said housing comprising an angle bracket having vertically spaced slots formed in one flange thereof adapted to cooperate with one of the pairs of studs whereby said bracket may be slipped over said studs between the housing and the nuts on the studs into a position to be supported on said studs, means on said flange cooperating with means on the housing for restraining said bracket against upward movement relative to said housing, a pair of adapter brackets, a bolt connecting one of said brackets to the other flange of said angle bracket, means for preventing rotation of said adapter bracket on said bolt, means for connecting the other adapter bracket to the housing comprising a pair of vertically spaced lugs extending laterally from one side thereof and having slots formed therein adapted to cooperate with the second pair of studs whereby said lugs may be slipped over said studs between said housing and the nuts on the studs into a position to support the adapter bracket on said studs, and lift means supported on said angle bracket.

9. The combination with a tractor including an axle housing having two pairs of studs extending outwardly therefrom in fixed position thereon with nuts threaded on said studs, means serving as a plate having slots therein adapted to pass over said nuts and be supported on said studs, means for supporting an implement on said plate means, and means adjacent each end of said plate means for preventing movement of the latter relative to said axle housing when said nuts are tightened.

10. In a tractor having a rear axle housing, the combination of two pairs of studs on said housing at each side of the tractor, a pair of supporting brackets, one adapted to be detachably mounted on each pair of inner studs and each supporting bracket being slotted to receive the studs, two pairs of right and left hand adapter brackets, one pair having slotted lugs providing for attachment of the brackets to the outer studs at each side of the tractor, the other pair of adapter brackets having securing means and slotted lugs providing for the optional attachment of said other pair of adapter brackets to said supporting brackets, respectively, or to said inner studs in lieu of said supporting brackets, and implement receiving means on each of said adapter brackets.

11. In a tractor having a rear axle housing, the combination of two pairs of studs on said housing at each side of the tractor, a pair of supporting brackets, one adapted to be detachably mounted on each pair of inner studs and each supporting bracket being slotted to receive the studs, two pairs of right and left hand adapter brackets, implements receiving means on each adapter bracket, one pair right and left hand adapter brackets having means for mounting the same on the outer pairs of studs, and means for attaching the other pair of right and left hand adapter brackets to said supporting brackets, respectively, so that each of the associated implement receiving means is disposed to one side of the associated inner pair of studs, said other pair of adapter brackets having laterally disposed slotted lugs arranged so that when interchanged the adapter brackets may be mounted on the inner studs in lieu of said supporting brackets with the implement receiving means of such adapter brackets disposed in substantially the same position relative to the inner studs as they are disposed when the adapter brackets are secured to the supporting brackets.

12. A bracket for attaching the draft bar of a cultivating unit to the rear axle housing of a tractor comprising means for connecting said bracket to said draft bar, and means including a pair of vertically spaced lugs extending laterally from one side of said bracket to provide means for attaching said bracket to said rear axle housing.

13. A bracket for attaching the draft bar of a cultivating unit to the rear axle housing of a tractor comprising means for connecting said bracket to said draft bar, means including a pair of vertically spaced lugs extending laterally from one side of said bracket to provide means for attaching said bracket to said rear axle housing, and a bolt carried by said bracket to provide means for attaching said bracket to a second bracket.

14. The combination of a bracket for attaching the draft bar of a cultivating unit to the rear axle housing of a tractor comprising means for connecting said bracket to said draft bar, means including a pair of vertically spaced lugs extending laterally from one side of said bracket to provide means for attaching said bracket to said rear axle housing, a second bracket, a bolt carried by said first bracket to provide means for attaching said bracket to the second bracket, and means on said first bracket cooperating with means on said second bracket for holding said first bracket against rotative movement on said bolt.

15. A hitch device for use with a tractor having a rear axle housing provided with two pairs of vertically spaced studs extending outwardly therefrom at spaced points thereon with nuts threaded on the outer ends of said studs, said hitch device comprising means for detachably connecting a part to said housing comprising a bracket having vertically spaced slots formed therein adapted to cooperate with one of the pairs of studs whereby said bracket may be slipped over said studs between the housing and the nuts on the studs into a position to be supported on said studs, means on said bracket cooperating with means on the housing for restraining said bracket against upward movement relative to said housing, a pair of adapter brackets, means connecting one of said adapter brackets to said first bracket, means for preventing rotation of said adapter bracket on said connecting means, means for connecting the other adapter bracket to the housing comprising a pair of vertically spaced lugs extending laterally from one side thereof and having slots formed therein adapted to cooperate with the second pair of studs whereby said lugs may be slipped over said studs between said housing and the nuts on the studs into a position to support the adapter bracket on said studs, and lift means supported on said first bracket.

THEOPHILUS BROWN.
TALBERT W. PAUL.